Sept. 11, 1923.
R. S. BLAIR
FLUID METER
Original Filed Dec. 5, 1917
1,467,565
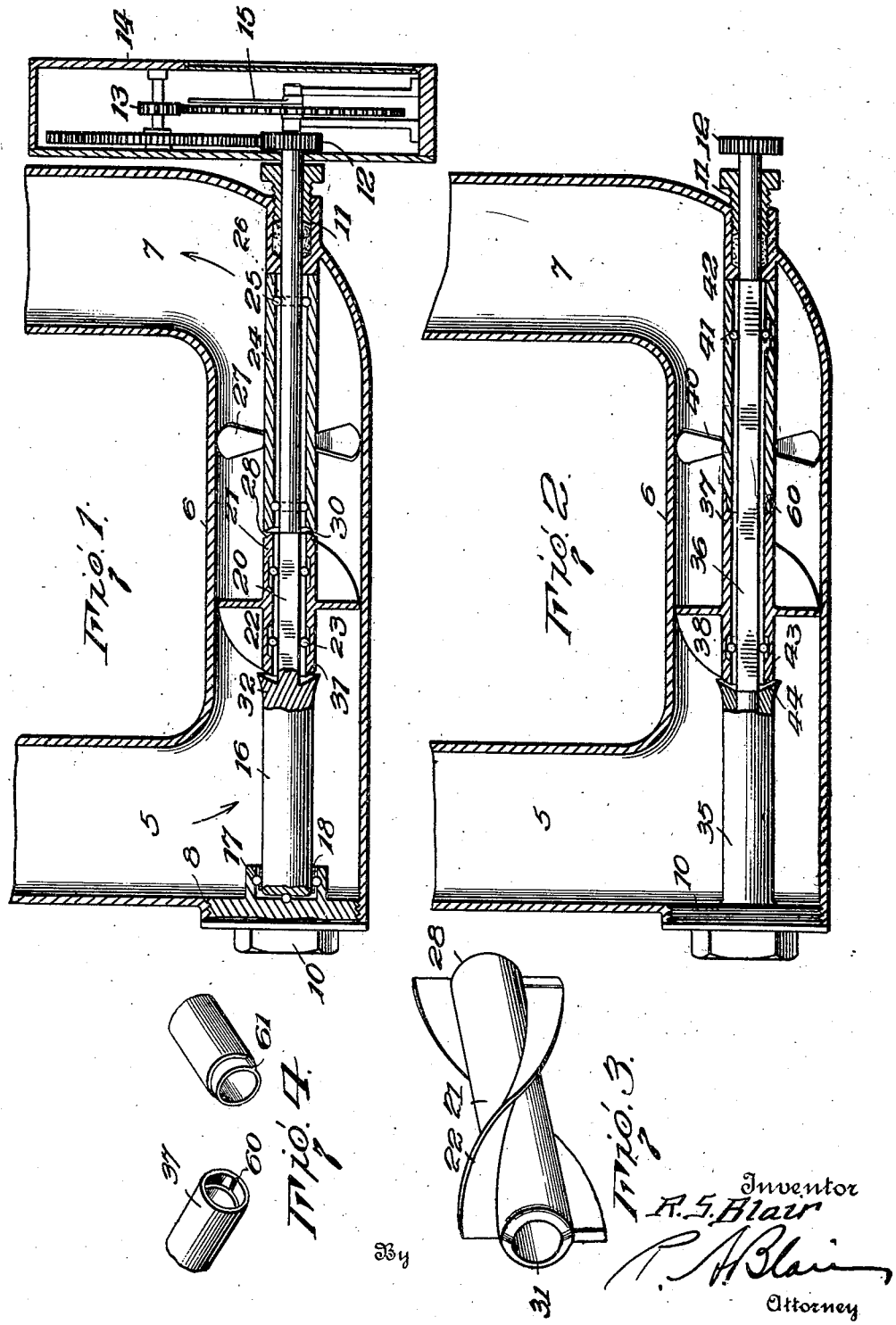

Patented Sept. 11, 1923.

1,467,565

UNITED STATES PATENT OFFICE.

ROBERT S. BLAIR, OF STAMFORD, CONNECTICUT.

FLUID METER.

Application filed December 5, 1917, Serial No. 205,659. Renewed February 15, 1923.

*To all whom it may concern:*

Be it known that I, ROBERT S. BLAIR, a citizen of the United States of America, residing at Stamford, in the county of Fairfield and State of Connecticut, have invented certain new and useful Improvements in Fluid Meters, of which the following is a specification.

This invention relates to meters, and in its more specific aspect to fluid meters adapted to measure and register the rate of flow of a liquid passing through a conduit. While especially adapted for measuring water used in the water systems of buildings as will be hereinafter described, it is, of course, to be understood that without material modification, it is susceptible to other uses and applications.

One of the objects of the present invention is to provide a meter of the above general character adapted to more accurately measure the flow of liquid than has heretofore been possible. A further object is to provide a simple and practical meter having relatively few parts which will be inexpensive to manufacture and easy to assemble. A further object is to provide a meter which will be reliable and efficient in use and operation. A further object is to provide a meter adapted to automatically compensate for the difference between the rate of rotation of the driven mechanism and the rate of flow.

Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawings in which are shown one or more of various possible embodiments of the several features of this invention, Figure 1 is a longitudinal sectional view showing such parts of a complete meter of preferred form as are necessary to fully understand the present invention.

Figure 2 is a similar view showing a modification;

Figure 3 is a detail view of one of the elements;

Figure 4 is a detail view.

Referring now to the drawings in detail and more particularly to Fig. 1, 5 denotes the inlet passage to a meter casing 6 provided with an outlet passage 7, the casing being of substantially U-shaped construction. This casing is provided at one end with a threaded opening 8 adapted to receive a coacting threaded closure member 10 supporting one end of a measuring mechanism as will be hereinafter described. The opposite end of this mechanism is supported in a stuffing-box 11 and terminates in a gear 12 coacting with certain reducing gears 13 within a housing 14 and which in turn actuates a dial pointer 15 of any desired type for indicating or recording the amount of liquid passing through the meter.

The meter mechanism comprises a longitudinally disposed shaft 16, one end of which is supported in the member 10 by intermediate ball bearings 17 held in place by a suitable retainer 18. The opposite end of this shaft passes through the stuffing box 11 as above stated. The central part of the shaft 16 is provided with a relatively short squared portion 20 upon which is mounted a rotor comprising a sleeve 21 carrying a plurality of high pitched vanes or propeller blades 22 constituting a rotary inclined member. Intervening ball bearings 23 are positioned where necessary to permit of easy longitudinal sliding movement of the rotor with respect to the shaft 20 without relative rotation therebetween.

The right hand portion of the shaft 16 is enclosed by an auxiliary power means including a sleeve 24 preferably supported by ball bearings 25 adapted to travel in annular raceway 26 formed in the shaft, the parts being so positioned and arranged as to permit the sleeve 24 to rotate independently of and at a materially higher speed than the shaft 16, due to the low pitch of propeller blades or vanes 27 carried by the sleeve 24.

It will be noted that the rotor is provided at one end with a conical clutch surface 28 adapted to coact with a complementary clutch surface 30 on the left hand end of sleeve 24. The opposite end of the rotor 21 is similarly shaped, as indicated at 31 in order to neutralize the hydrostatic pressure exerted upon its opposite ends. The shaft 16 at this point is somewhat enlarged or provided with a flared portion 32 adapted to divert the current from the end of the sleeve 21.

The construction of this device being clear from the above description, a brief statement of the operation thereof is as follows: Assuming the liquid to be measured as flowing in through the inlet 5 through considerable pressure a turning movement of the rotor or propeller 22 will be caused thereby and as this propeller rotates it will, due to its connection with the shaft 16, drive the intervening gearing within the meter housing and record the amount of liquid or water passing through the meter, it being assumed, for example, that one rotation of the propeller takes place during the passage of every cubic foot of water or predetermined fraction thereof. The sleeve 24, however, due to the lower pitch of the propeller blades will be rotated at a much higher speed and in a way constitute the certain source of auxiliary power adapted to drive the rotor 22 should its rate of rotation fall below the desired ratio to the flow of water. Thus, the rotor will be speeded up as may be necessary. In other words, if there is any slip of the rotor, or if for any reason such as friction in the bearings, it fails to rotate the shaft 16 proportionally to the flow of water, then it will be carried longitudinally along the shaft 16 towards the right, bringing the clutch surfaces 28 and 30 into engagement. As the propeller 27 is rotating at a relatively higher rate, rotor 21 will take from the sleeve 24 such power as may be necessary to cause it to rotate at the desired ratio. If it absorbs too much power, then it will tend to move in the opposite direction against the flow of water and into proximity to the flared end 32 of the enlarged portion of the shaft 16. In this manner automatic means are provided for maintaining the desired ratio between the rate of rotation of the propeller and the rate of flow.

It may here be noted that the term "direct" is used in the following claims in connection with relative longitudinal movement and the like, to exclude a mere change to a different longitudinal position, and not to call for exactness in the direction of movement; in other words, it is here used as the antonym of "indirect" and not the antonym of "inexact."

In Fig. 2 of the drawings there is shown a modified form of apparatus embodying certain features of that first described, and on the other hand having features peculiar to itself. In this apparatus there is provided a stationary support or bearing member 35 which may be integral with the closure member 10. Journaled at its end in a suitable bearing in member 35 is the square driving shaft 36 which leads to the indicating apparatus. A sleeve member 37 is mounted about the shaft 36 to turn therewith but also to move freely longitudinally thereof, suitable bearing balls and longitudinal raceways being employed as shown adjacent the member 35. This sleeve is provided with a high-pitched vane 38, substantially identical with the vane 22 hereinbefore referred to, and is connected with a similar sleeve on which is formed the relatively low-pitched driving vanes 40. The form of connection is preferably that indicated in Fig. 4 of the drawings, and is such as to permit relative longitudinal movement of these sleeve members, relative rotary movement being prevented by the interlocking groove and tongue 60 and 61. The rear end of the propeller sleeve is provided with a suitable ball bearing 41, and this sleeve abuts as at 42 against the stuffing box bearing. On the forward or left-hand end of the sleeve 37 there is formed a clutch surface 43 adapted to mate with a clutch surface 44 at the end of the support 35. This latter clutch member is preferably flared outwardly to prevent water from impinging against the end of the sleeve.

As shown in Fig. 3, the rotor blades or vanes 22 and 38 are beveled at their ends in a direction parallel to the flow of current in order to prevent such flow from having an endwise influence on the rotor due to striking of the fluid against the edges of the vanes.

Recurring to Fig. 2, the action of this apparatus is substantially as follows:—

The vanes 40 are so proportioned as to supply slightly more than enough power to the rotor sleeve 37 than would be required to compensate for its slip. Any excess of power, however, beyond that required for one rotation of the rotor vane during the travel of the fluid current throughout its pitch distance, is prevented by the braking action of the clutch surface 44. It will be clear that any tendency to excess speed of the rotor will cause it to tend to move longitudinally on the shaft 36 and bring about the required braking action between the clutch surfaces 43 and 44. On the other hand, any excess of braking action tends to relieve itself by a movement of the rotor away from member 35.

It will thus be seen that in this last apparatus the rotor will occupy a position in which it secures from the member 35 just sufficient braking effect to prevent it from being driven at excessive speed, and that the rotor will thus accurately measure the flow of fluid without either positive or negative slip.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim:

1. In meter construction, in combination, a member exposed to fluid current and driven thereby, means mounting said member to permit direct movement thereof substantially in the direction of flow of the current, a source of power, and means adapted operatively to connect said member with said source of power on its movement in the direction of the flow of current.

2. In meter construction, in combination, a rotary inclined member exposed to a fluid current and driven thereby, means mounting said member to permit relative movement longitudinally of the current thereof, and utilize longitudinal components of fluid pressure thereon to cause said movement, a source of power, and a connection between said rotary inclined member and source of power controlled by said movement.

3. In meter construction, in combination, a rotary inclined member exposed to fluid current and driven thereby, means supporting said member to permit direct movement thereof substantially in the direction of flow of the current, a source of power, and means adapted to automatically to connect said member with said source of power upon movement of said member in the direction of flow of the current, the end surfaces of said rotary member being substantially parallel to the direction of flow of current.

4. In meter construction, in combination, a member exposed to a fluid current and driven thereby, means supporting said member to permit direct movement thereof substantially in the direction of flow of current, an auxiliary source of power actuated by the flow of current adapted to supply driving force to said member to compensate for its tendency to slip, and means adapted automatically by longitudinal movement of said member to lessen its speed upon its moving in a direction against that of the flow of current.

5. In a meter of the class described, in combination, a conduit through which liquid is adapted to pass, a propeller exposed to said liquid, recording apparatus, means connected with said propeller and with said recording apparatus, a second propeller exposed to said liquid, and means controlled by the tendency of said first propeller to move longitudinally, and controlling the driving tendency of said second propeller thereon.

6. In a meter of the character described, in combination, a conduit through which a liquid is adapted to pass, a power shaft adapted to be connected with a recorder, means for rotating said shaft proportionally to the rate of flow including a rotor, and a separately mounted low pitched propeller, said rotor being capable of free longitudinal movement with respect to said shaft and into and out of engagement with said low pitched propeller.

7. In a meter of the character described, in combination, a conduit through which a liquid is adapted to pass, a shaft, means for rotating said shaft substantially proportionally to the rate of flow including a rotor keyed upon said shaft and capable of free longitudinal movement, a low pitched propeller independently rotatably mounted upon said shaft, and speed varying connection between said propeller and rotor adapted to be brought into and out of operation according to the longitudinal sliding movement of said rotor.

8. In a meter of the character described, in combination, a conduit through which a liquid is adapted to pass, a shaft, means for rotating said shaft substantially proportionally to the rate of flow including a rotor mounted upon said shaft and capable of direct longitudinal movement, a low pitched propeller independently rotatably mounted upon said shaft, and speed varying connection between said propeller and rotor adapted to be brought into and out of operation according to the longitudinal sliding movement of said propeller, said connection including two coacting cone clutch members mounted respectively on said rotor and propeller.

9. In meter construction, in combination, a device exposed to a fluid current and driven thereby, a source of power driven from said fluid current, said device comprising a member movable in the direction of flow of said current and in a direction opposite thereto by utilizing pressure components longitudinal of the current, and means controlled by said member adapted automatically to draw from said source of power sufficient effective driving energy to compensate for the tendency to slip of said device.

10. In meter construction, in combination, a power shaft adapted to be connected with a recording device, an inclined member mounted upon said shaft to rotate therewith and adapted to be exposed to a fluid current, and directly movable in a direction substantially parallel with said shaft, and means controlled by a movement thereof and deriving energy from said current adapted automatically to supply to said shaft an effective driving tendency equal to that required to compensate for slip.

11. In meter construction, in combination, a power shaft adapted to be connected with a recording device, an inclined member mounted upon said shaft to rotate therewith and adapted to be exposed to a fluid current and directly movable in a direction substantially parallel with said shaft, means controlled by a movement thereof and deriving energy from said current adapted automatically to supply to said shaft an effective driving tendency equal to that required to compensate for slip, a conduit through which said fluid current passes, and a recording device connected to be driven from said shaft.

12. In a meter of the character described, in combination, a conduit through which a liquid is adapted to pass, said conduit being substantially of U-shape form and provided with a removable closure at one end, a shaft supported by said closure extending through the conduit, a gear at one end of said shaft adapted to actuate a recorder, a rotor associated with said shaft and having a free longitudinal sliding connection therewith, and a propeller mounted upon said shaft having an independent rotative movement, said parts being so positioned and arranged as to permit a removable closure thereof when said closure is removed.

13. In meter construction, in combination, a rotary device comprising a propeller blade adapted to be exposed to the fluid upon its forward and rear surfaces, means mounting said propeller blade to permit its movement longitudinally of the current to which it is exposed, by utilizing pressure components longitudinal of the current, a source of power connected with said device deriving its energy from the passing current and adapted to tend to drive the propeller, and means adapted upon the pressure of the fluid upon the rear surface of said propeller blade exceeding that upon the forward surface to decrease effect of said source of power to drive said propeller blade.

In testimony whereof I affix my signature in the presence of a witness.

ROBERT S. BLAIR.

Witness:
R. A. BLAIR.